March 16, 1943.                H. GIFFORDS                2,314,086
                               HEATING SYSTEM
                      Filed Aug. 5, 1938          2 Sheets-Sheet 1

INVENTOR.
Harry Giffords
BY
ATTORNEYS.

March 16, 1943.  H. GIFFORDS  2,314,086
HEATING SYSTEM
Filed Aug. 5, 1938  2 Sheets-Sheet 2

INVENTOR.
Harry Giffords
BY
ATTORNEYS.

Patented Mar. 16, 1943

2,314,086

UNITED STATES PATENT OFFICE 2,314,086

HEATING SYSTEM

Harry Giffords, New York, N. Y.

Application August 5, 1938, Serial No. 223,199

13 Claims. (Cl. 237—19)

This invention relates generally to air conditioning and more particularly to an air conditioning system comprising heat generating means and having associated therewith means for utilizing a portion of the generated heat for purposes other than air conditioning.

Coordinately therewith it relates to a method of heating water and to a method of distributing heat from a central point to points distant therefrom.

Among the general objects of my invention is the provision of an air conditioning system having a water heating arrangement associated therewith, and more particularly an air conditioning system and associated water heating arrangement for use throughout the year, and the provision of an air conditioning system having a heating plant auxiliary to the air conditioning system associated therewith.

Among the general objects of my invention are further the provision of an effective method for imparting heat from heated air to water, and the provision of a novel and effective method for utilizing water so heated for heating purposes.

Where it has been attempted to combine a water heating system with an air conditioning unit it has been found necessary to provide an added water heating system for summer use, as the heat generator of the air conditioning unit could not be operated in hot weather without heating the house as well, which of course would be objectionable.

It is therefore among the more particular objects of my invention to provide an air conditioning system adapted to supply heated air in cold weather and cool air in hot weather, and to furnish a supply of hot water throughout the year as well, and to provide such an air conditioning system and water heating system in which the hot water is stored ready for use or in which the water is heated as it is needed, or in which both of the last mentioned systems are combined.

In the operation of air conditioning systems using a body of conditioned air distributed to various points through ducts it has been found that while the conditioned air will readily pass into large rooms, it enters small rooms, such as bath rooms, with comparative difficulty. Under extreme conditions these small rooms receive none of the conditioned air.

It is therefore also among the more particular objects of my invention to provide in association with an air conditioning system an auxiliary heating system adapted to furnish heat to such places as it is found difficult or impossible to supply with conditioned air, and to provide in association with an air conditioning system an auxiliary hot water heating system in which the water is heated by a current of heated air.

Among the more particular objects of my invention is further the method of distributing heat from a central heating plant by hot water heated by a current of heated air.

These objects, and such other objects of my invention as will hereinafter appear or be pointed out, are attained by the illustrative embodiments of my invention shown in the drawings, in which.

Figure 1:
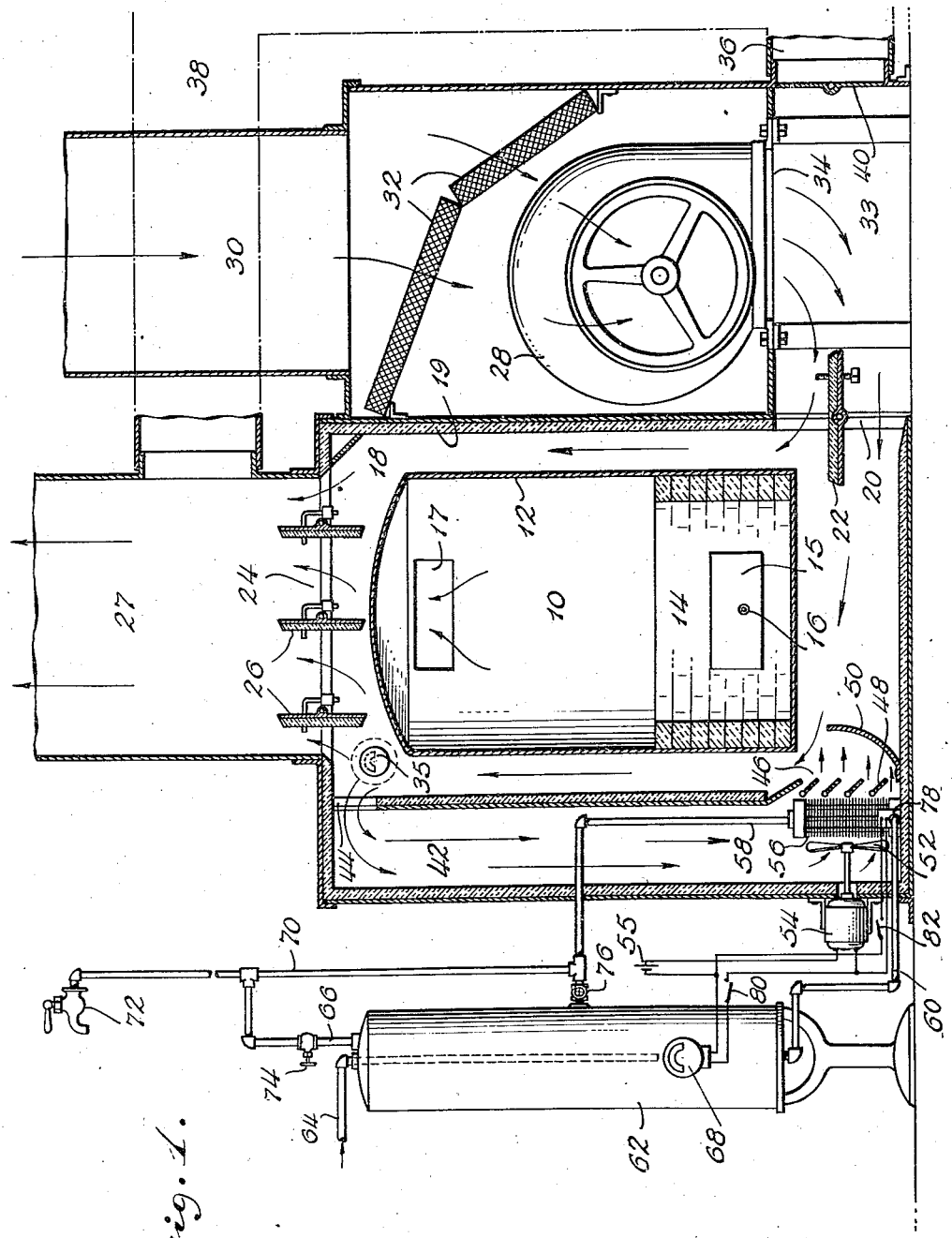
Figure 1 is an elevational view in section of one embodiment of my invention.
Figure 2:
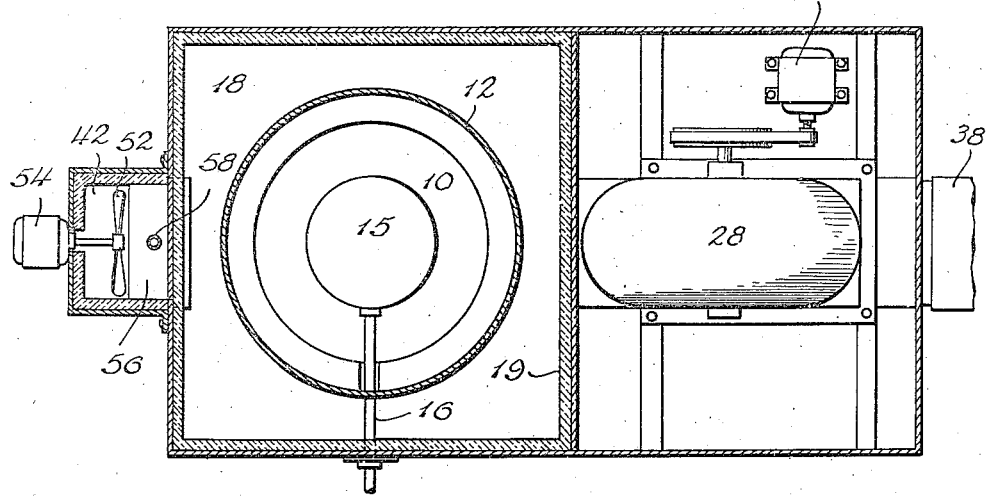
Figure 2 is a horizontal sectional view of the embodiment of Figure 1.

On viewing Figure 1 it will be observed that I show therein an air conditioning system comprising a heat generator 10 positioned within an air heating chamber 18. The heat generator may comprise, by way of example, a combustion chamber 14 within which is located an oil burner 15 supplied with fuel through a feed-pipe 16, and the products of combustion transmit heat to the air in chamber 18 through the walls 12 of the generator, which are preferably of material selected with a view to its heat conducting and radiating qualities. The products of combustion leave the heat generator 10 by means of a flue 17 connected to the chimney in the customary manner.

The air chamber 18 is shown as having flat insulated walls 19 insulated against the passage of heat and as provided with an inlet opening 20 having a closure 22 associated therewith. The closure 22 is preferably heat insulated for a purpose that will presently appear. The chamber 18 also has an outlet 24 provided with closure means 26. The closure 26 is shown as in the form of pivotally mounted plates or louvers and these are shown as heat insulated for a purpose that will presently appear. By making the closure 26 in sections it will be observed that vertical space is saved. If desired the sections may be made independently movable, so that only restricted portions of the outlet opening may be closed at one time. It will be understood of course that the single closure 22 might also be made in sections, if desired.

The outlet 24 of the air chamber 18 leads into the distributing duct 27, through which the conditioned air reaches various parts of the house.

Air circulating means for the system is shown in the shape of a centrifugal blower 28 driven by a motor 29 of any suitable or preferred type. The blower 28 draws air from the duct 30 which is in communication with the outer air through the air filters 32, and discharges it through the outlet 34 into a passage 33 from which it passes through the inlet 20 into the air chamber 18.

It will be understood that the apparatus just described may serve to supply a house with air that is filtered and is conditioned as to moisture and temperature, the distribution of the air taking place through auxiliary ducts leading from the main duct 27 into the various locations such as rooms.

In order to provide automatic temperature control I have shown a thermostatic device 35 positioned in the air chamber 18 which may be used to control the temperature of the heated air in said chamber by regulating the heater or oil burner or similar controllable furnace heat in any suitable or preferred manner, for instance, as by controlling the flow of oil into the burner where an oil burner is used.

Where it is desired to use the heat generator 10 of the air conditioning system for heating water it is readily seen that the system as described so far would be suitable only for use in cold weather since it would be undesirable to have the generator heat, no matter how reduced, circulate through the house in warm weather. In order to permit the operation of the generator in hot weather as well as in cold weather, I have shown a by-pass arrangement for the conditioned air, comprising a duct 38 connecting the passage 33 with the duct 27, so that the blower 28 may draw air from the inlet passage 30 and impel it directly into the duct 27 through the passage 38.

The inlet 36 to the passage 38 may be provided with closure means such as 40.

It will now be seen that by manipulating the heat insulated closures 22 and 26, the air chamber will constitute a heat insulated compartment within which the heat generator 10 may be operated during hot weather for heating water or for other purposes without affecting the air conditioning that is taking place independently through the by-pass duct 38. On the other hand during cold weather the closures 22 and 26 may be opened and the outlet 36 closed by the valve 40, so that all the conditioning air is forced to pass through the chamber 18, where it is heated.

In order to provide for heating water by means of the heat generator 10 I have shown an auxiliary air chamber 42 having an inlet opening 44 through which heated air may be drawn from the chamber 18, and an outlet opening 46 through which the air in chamber 42 may be discharged into the chamber 18. In order to direct the discharged air upward and to prevent its opposing the entrance of air through the inlet 20, I have shown a baffle plate 50 in front of the opening 46. Pivoted louvers 48 are shown by means of which the area of outlet 46 may be varied for regulation purposes. The walls of chamber 42 are preferably insulated, for obvious reasons, and are so shown.

In order to utilize the air in the passage 42 for heating water, I have shown a water heating arrangement at 56. This may comprise water ducts having walls of heat conducting material, such as metal, and provided with fins or vanes radiating from the outer surfaces thereof, and calculated for the absorption of heat and the conduction thereof into the water in the ducts so as to heat the water.

Means are shown to cause a circulation of air in the passage 42 and to direct it against the heater 56 which is shown as positioned in front of the outlet passage 46. Such means may be of any suitable or preferred type, such as the air fan or impeller 52 driven by the electric motor 54 drawing current from a suitable source such as 55.

The heater 56 is shown as provided with an outlet pipe 58 and an inlet pipe 60 and through these pipes the heater may be connected to a storage tank 62 within which the water which enters the heater 56 from the tank 62 and is heated therein and then passes into the tank 62 through the pipe 58 may be stored until ready for use. The operation of this system will be readily understood by analogy to the conventional hot water tank and heater system.

The inlet pipe for the tank 62 is shown at 64 and its outlet or distributing pipe at 66. Automatic temperature control of the water in the tank may be effected by means such as a thermostatic device 68 on the tank adapted to control the operation of the motor, as by shutting it off when the temperature exceeds a predetermined limit.

It will be observed that the water heating system just described can be operated in hot weather as well as in cold weather without causing any discomfort to the occupants of the house.

Where the use of a storage tank 62 for hot water is objectionable because of its heating effect in summer I may provide an instantaneous system of water heating. This may comprise a pipe 70 branching off from the outlet pipe 58 of the heater 56 and leading into one or more distributing outlets such as the faucet 72. A valve 74 is shown for disconnecting the outlet pipe of the tank 62, and a valve 76 is shown whereby entry of hot water from the heater 56 into the tank 62 is prevented.

When valves 74 and 76 are closed the heater draws cold water from the tank as before and heats it, and the heated water, which rises is drawn off through the taps 72 as needed.

While I have shown both the instantaneous system and the storage system in the same installation so that they can be used alternatively, it will be understood that my installation may be provided with either one alone.

It will further be understood that instead of a separate distribution system being used for the storage tank and the instantaneous system, the same distribution system may be used for both. For instance, the pipe 66 might be connected to the pipe 70 so that the tank would discharge through the faucet 72. By inserting a valve into the pipe 70 where it branches off from the pipe 58 the instantaneous system could be disconnected, while to use the instantaneous system this valve would have to be opened and the valves 74 and 76 closed as before.

It will be understood of course that where the instantaneous system is used to supply an extensive distribution system that the heater 56 must be of adequate capacity.

As an added feature I may provide automatic control for the instantaneous water heating system as by applying a thermostatic device 78 to the heater 56 whereby the motor 54 may be controlled.

Where both the storage and the instantaneous system are used in the same installation I may provide switches 80 and 82 by means of which either the thermostat 68 or the thermostat 78 may be disconnected according to which system is being used.

Figure 3:
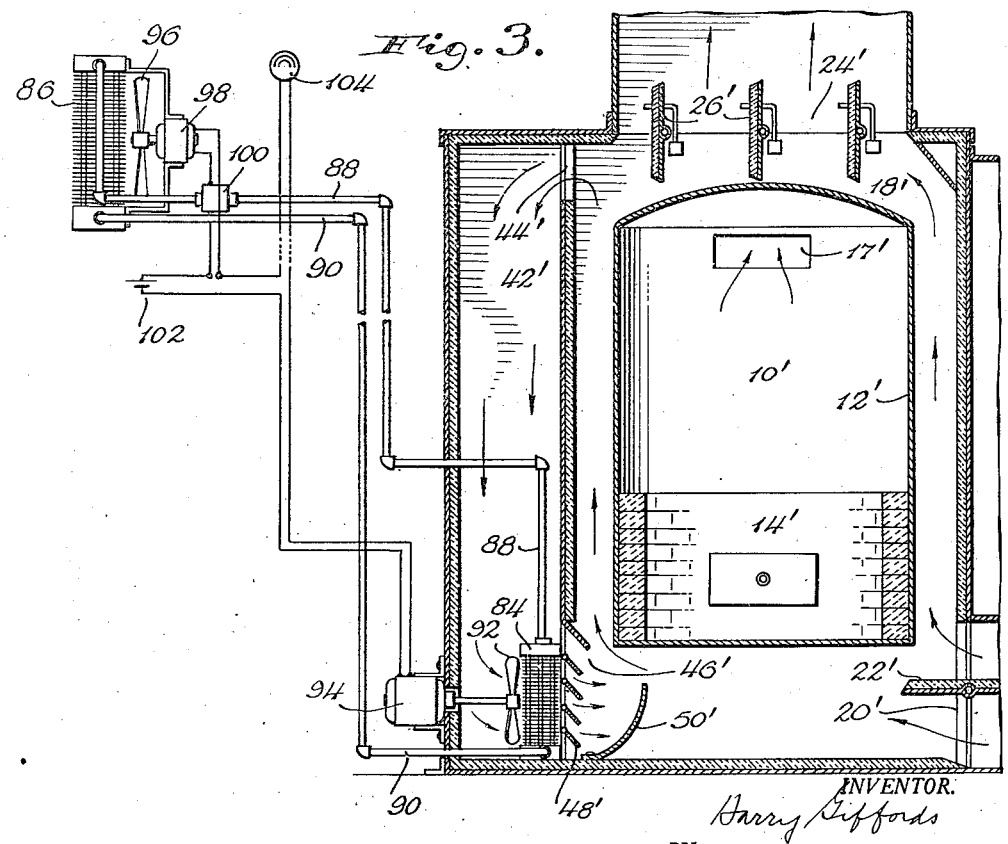
Figure 3 is an elevational view in section, of another embodiment of my invention.

In Figure 3 I have shown another embodiment of my invention in which an air conditioning system is combined with a hot water heating system.

The latter may be used in places where, as already explained hereinabove, it is difficult or impossible to cause conditioned air to enter, as in small rooms such as bath room or kitchen. It may also be used for heating purposes in places it is not desired to air condition, as in garages for instance.

While the auxiliary heating system may be used in conjunction with an air conditioning system adapted for use throughout the year, such as that of Fig. 1, it will be obvious that it may be used with equal advantage as auxiliary to a system adapted only for cold weather use.

Since the parts of the air conditioning system shown in Fig. 3 are identical with the corresponding parts of Fig. 1, they have been numbered correspondingly, but the numbers have been primed. Since moreover the functions of the corresponding parts are identical no further description thereof is believed necessary.

At 84 in Fig. 3 I have shown a heater similar to the heater 56 and heated air from the chamber 42' may be circulated thereover by means such as the fan 92 driven by the electric motor 94 connected to a suitable source of electric current 102.

At 86 is shown a radiator similar to the heater 84 located in a room it is desired to heat. Through the pipe connections 88 and 90, the heated water from the heater 84 may circulate through the system 86, 84. In order to increase the heat emission from the radiator 86 and to distribute the heated air, I have shown means in the form of a fan 96 for moving a current of air over the radiator. Such means may be of any suitable or preferred type. By way of example I have shown an electric motor 98 connected to the power source 102 to drive the fan 96.

Automatic temperature control may be provided as indicated at 104, which represents a thermostatic device adapted to control the motors 94 and 98. Obviously if desired it can be arranged to control either motor alone.

In order to increase the rapidity of the water circulation in the system 84, 88, 86, 90, I may introduce a water pump. At some point in the system I have shown such a pump at 100 in the pipe 88. If desired this pump may be driven electrically and also be controlled thermostatically.

While I have shown closures 22 and 26 of the counterbalanced type which depend upon their action in opening or closing upon the velocity of the air current, it will be understood that these elements may be of the mechanically controlled type or motorized controlled type in conjunction with suitable thermostats for bringing them into appropriate positions for opening or closing depending upon whether the heated air is to be confined for house heating purposes or for heating the water supply.

It will also be observed that by my heating system the employment of coils heated by the products of combustion in the furnace is avoided, thereby avoiding the detrimental effects by coils so disposed in the furnace or heat generator 10. Avoiding this condition prevents the over-heating of the coils in the combustion chamber particularly in extreme cold weather. In mild weather an inadequate supply of hot water would occur if and as the heating coils are disposed in the combustion chamber. Furthermore, as thermostatic control of the heater for the central furnace does not control the hot water supply for domestic use my system is not affected by the variables which may be encountered in the house heating system.

In general, it will be observed that one of the novel features of my invention resides in the employment of a unit heater for making a circulating water supply available in which heated air is conducted over the unit heater for heating a water supply whether such water supply be employed for domestic consumption indirectly in a storage container or tank or to act as a source of heat in a radiator.

Accordingly, in the claims where I make reference to a unit heater it is intended to include a contrivance which has a low liquid capacity such as water, and a high radiation surface such as extended fins operable by high velocity gaseous medium.

It will be observed that I make available such unit heaters in conjunction with substantially high velocity heated air, heated within the range of 50 to 350° F. preferably about 190° F. to heat a liquid such as water by conducting such gaseous medium over the unit heaters and make the liquid or water so heated available for domestic water supply or for other purposes without interference with the efficiency of an air conditioning system.

It will also be observed that while I may efficiently utilize all of the features in one installation these features may be independently employed as more particularly outlined within the scope of the appended claims.

Having thus described my invention and illustrated its use, what I claim as new and desire to secure by Letters Patent is:

1. In a hot air heating and domestic hot water supply system; the combination with a hot air heating circuit including a heater, a first casing surrounding said heater, a space to be heated, supply and return conduits connecting said first casing to said space and providing for the circulation of heated air from the said casing to the space and back to the casing; of a domestic hot water heating circuit including a second casing, water heating means within said second casing, inlet and outlet means connecting said second casing to said first casing and providing for the circulation of heated air from the first casing to the second casing and back to said first casing, independently of circulation thru said space.

2. In a warm air heating system having air as the heat circulating medium and means for normally maintaining the heat requirements of such warm air heating system, the combination having a domestic hot water supply system associated therewith, a heat absorbing element in heat exchanging relationship with the air in said heating system for deriving heat from said air of the heating system, and means for independently circulating said air of the heating system including means for directing and conducting said air about said absorbing element at a rate of circulation in excess of the normal rate of circulation of the air of said first system.

3. In a warm air heating system having air as the circulating medium and means for normally maintaining the heat requirements of such system, the combination having a domestic hot water supply system associated therewith, a heat absorbing element in heat exchanging relationship with the air in said heating system for deriving heat from said air of the first system, and means for positively and independently circulating said air of the first system including means for directly conducting said air about said absorbing element of the second system at a rate of circulation that is independent of the rate of circulation of the air of said first system.

4. In a warm air heating system, means forming an air heating chamber encasing a heat generator for heating said chamber, the combination therewith of means forming a second chamber including means for bringing the second chamber in communication with said first chamber and including means to provide for circulation of air through both of said chambers, means independent of said heat generator for causing circulation of air in each of said chambers independently of each other, and a heat absorbing element having means connecting said element to a hot water heating system to supply the heat absorbed by said element to said hot water system, said absorbing element being positioned in the path of said circulating air in said second chamber.

5. In a warm air heating system, means forming an air heating chamber encasing a heat generator for heating said chamber, the combination therewith of means forming a second chamber in communication with said first chamber and including means to provide for circulation through both of said chambers, means independent of said generator and positively operated by external power means for causing circulation of air in said chambers and through a predetermined path in said second chamber, a heat absorbing element having means connecting said element to a hot water heating system to supply the heat absorbed by said element to said hot water system, said absorbing element being positioned in the direct path of said circulating air so caused in said second chamber, the first of said chambers being provided with a closeable opening for permitting external air to enter therein and being further provided with a closeable opening leading into a distributing duct from said chamber whereby circulation of air may be selectively limited to said first and second chamber.

6. In a warm air heating system, insulated walls forming an air chamber encasing a heat generator for heating said air compartment, the combination therewith of a distributing duct communicating with said compartment through an opening in a wall of said compartment, means for closing the opening between said compartment and said duct, an inlet opening through which air may be introduced into said compartment, a closure for said inlet opening, whereby when said respective closing means and closure are in their closed positions, the compartment will be closed, means independently and positively operated in said compartment for rapidly circulating the air therein when it is closed, and heat absorbing means providing heat to an independent system positioned in the path of said circulating air and including means for directing and conducting the circulating air over and about said absorbing means.

7. In a warm air heating system, walls forming an air heating chamber encasing means for heating said chamber, the combination therewith of a second chamber in communication with said first chamber so as to provide for circulation of air through both of said chambers, positively operated means for causing rapid circulation of air in said chambers, and a heat absorbing finned element for rapidly absorbing heat positioned in the path of said circulating air of said second chamber and including means for directly conducting the circulation of air over said element, said element being connected with an independent water circulating system.

8. In a warm air heating system, in combination with means defining the main air heated chamber thereof, means forming a second chamber having communication passage with said first chamber so as to permit circulation through both of said chambers, and forming a well-defined path in which said air circulates, means for causing circulation of air in said chambers, a heat absorbing element having means connecting said element to a hot water heating system to supply the heat absorbed by said element to said hot water system, said absorbing element being positioned adjacent said passage and in the direct path of said circulating air generated within said passage, and positive circulating means for rapidly distributing air over said element, said first chamber being provided with openings communicating respectively with the external air and with a distributing duct from said chamber whereby circulation of air may be selectively limited to said first and second chamber.

9. In an air conditioning system, means forming an insulated air chamber, means for heating said chamber positioned within said chamber, the combination having separate means forming an auxiliary insulated air chamber positioned in close adjacency to said first chamber and communicating therewith through spaced openings, means in said auxiliary chamber for circulating air therethrough and through said first chamber, heat absorbing means for absorbing and transmitting heat to a domestic hot water system positioned in said auxiliary chamber, a distributing duct, an opening in a wall of said first chamber leading into said distributing duct, an insulated closure for said opening, a passage communicating at one end with the external air, filter means in said passage, air circulating means in said passage, a compartment adapted to receive the filtered air from said passage, said compartment having an opening leading into said first chamber, a closure for said opening, a conduit leading from said compartment to said distributing duct and means for closing the opening in said compartment leading into said conduit.

10. In an air conditioning system, means forming an insulated air chamber, means for heating said chamber positioned within said chamber, the combination having means forming an auxiliary insulated air chamber positioned in close adjacency to said first chamber and communicating therewith through spaced openings, positively operated means in said auxiliary chamber for rapidly circulating air therethrough and through said first chamber, heat absorbing means for absorbing and transmitting heat to a domestic hot water system positioned in said auxiliary chamber, a distributing duct, an opening in a wall of said first chamber leading into said distributing duct, and an insulated closure for said duct.

11. In an air heating system, means forming a main chamber, means for supplying air to said chamber, means for heating said chamber, the combination therewith of means forming an auxiliary chamber communicating with said main chamber through openings at its ends, heat absorbing means positioned in said auxiliary chamber in front of one of said openings, blower means in said auxiliary chamber for rapidly moving air over said heat absorbing means and through its adjacent opening at a higher rate than the movement of air caused by said heating means, and means for regulating the size of said opening.

12. In an air heating system, having means forming a main chamber and heating means therefor, the combination therewith of means forming an auxiliary chamber communicating with said main chamber through an opening at its upper end and an opening at its lower end, positively operated means for causing air to move rapidly out of said auxiliary chamber through the lower opening, and a baffle for diverting said outwardly moving air upwardly over said heating means, a heat absorbing element in said auxiliary chamber and a hot water circulating system connected with said element.

13. In a warm air heating system the combination comprising means forming a main heated chamber having air heating means therefor producing circulation of the air by convection in said chamber, and means in said chamber for independently and positively circulating a predetermined portion of said air in a closed path within said chamber in excess of the circulation of the air by convection produced by said heating means, an auxiliary circulating system adapted to receive heat from said heated air of said main chamber, said auxiliary system comprising a heat absorbing member positioned in the direct path of circulation generated by said circulating means.

HARRY GIFFORDS.